(12) United States Patent
Bowlus

(10) Patent No.: US 7,967,201 B2
(45) Date of Patent: Jun. 28, 2011

(54) METHOD AND SYSTEM TO IMPROVE PRODUCT RECALLS

(76) Inventor: Mitchell D. Bowlus, Chagrin Falls, OH (US)

( * ) Notice: Subject to any disclaimer, the term of this patent is extended or adjusted under 35 U.S.C. 154(b) by 232 days.

(21) Appl. No.: 12/182,677

(22) Filed: Jul. 30, 2008

(65) Prior Publication Data

US 2009/0032589 A1    Feb. 5, 2009

Related U.S. Application Data

(60) Provisional application No. 60/954,674, filed on Aug. 8, 2007, provisional application No. 60/952,674, filed on Jul. 30, 2007.

(51) Int. Cl.
*G06K 15/00* (2006.01)

(52) U.S. Cl. ......... 235/383; 235/487; 235/375; 235/385

(58) Field of Classification Search .............. 235/383, 235/487, 375, 385, 381; 705/10, 22
See application file for complete search history.

(56) References Cited

U.S. PATENT DOCUMENTS

| | | | | |
|---|---|---|---|---|
| 2001/0056359 | A1* | 12/2001 | Abreu | 705/3 |
| 2004/0000997 | A1* | 1/2004 | Stevens, III | 340/572.1 |
| 2008/0011844 | A1* | 1/2008 | Tami et al. | 235/385 |
| 2009/0089111 | A1* | 4/2009 | Walker et al. | 705/7 |
| 2010/0235250 | A1* | 9/2010 | Bar-Levav | 705/23 |

* cited by examiner

*Primary Examiner* — Edwyn Labaze
(74) *Attorney, Agent, or Firm* — Fay Sharpe LLP

(57) ABSTRACT

A method and system is provided to deter purchases of recalled products. An inventory control system is provided with an identification code corresponding to a recalled product. The identification code of the recalled product is identified when it is scanned or otherwise determined to be part of a sale at a retail establishment. The purchase of the recalled product corresponding to the identification code identified is automatically denied.

17 Claims, 5 Drawing Sheets

METHOD AND SYSTEM TO IMPROVE PRODUCT RECALLS

This application claims priority to Provisional Application No. 60/952,674, filed Jul. 30, 2007, entitled "Method and System to Improve Product Recalls", by Mitchell D. Bowlus; and Provisional Application No. 60/954,674, filed Aug. 8, 2007, entitled "Method and System to Improve Product Recalls", by Mitchell D. Bowlus, the disclosures of which is each hereby incorporated by reference in their entirety.

BACKGROUND

In business, a product may be put on the market that has some defect, be it inherent or caused by use of the product. When this occurs, the product should be recalled, and removed from the stream of commerce. The present application is directed to improving that process by which recalls are complied with by the retailers selling the recalled product. Recalled products may include those found in the consumer and industrial areas, among others, and may be related, but not limited to, food, beverages, dry goods, pharmaceuticals, over-the-counter drugs, among others.

The following scenario is provided simply as an example, and is not intended to describe the foregoing concepts in a limiting manner.

Items or products presented for purchase by consumers may contain a defect, such as bacteria, foreign objects, or other defects that may cause harm to the persons consuming the item.

It is understood by the inventor that a recall may be undertaken voluntarily by the company manufacturing the product and/or the retailer selling the product, or it may be required by the authorities in the area responsible for enforcing the laws. For example, in the United States, such official recalls may be undertaken by state governments, city governments, as well as the federal government.

When the recall is undertaken by an arm of the government, the manufacturer or (an/or wholesaler) or the retailer commonly contacts the parties involved, and will then issue statements to the public warning them of the defective product. At the same time, the government, the manufacturer (and/or wholesaler) and/or retailer will attempt to contact the various establishments that are selling the product.

However, due to human error, it is also understood by the inventor that product may not be removed from the retailer. Therefore, the federal government has teams of individuals that will disperse throughout the geographic areas where the defective product has been identified, and attempt to check the retail establishments to ensure the product has been removed. However, again, due to manpower issues and human error, not all defective products may be removed. Also, it may take some time between the issuance of the recall, and when the "on the ground" inspections are undertaken. Still further, there are times when the "on the ground" inspection does not even take place, again, due to human error and/or lack of manpower.

This leads to a situation that can be highly detrimental, if not fatal, to consumers. For example, if a consumer enters a retail establishment which has not removed the recalled product due to error and/or oversight, the customer can buy the defective product, resulting in their sickness or possible death.

Further, the government's use of "on the ground" inspections is costly.

The present application is directed to increasing the safety of the recall process and the efficiency of the process.

INCORPORATION BY REFERENCE

Provisional Application No. 60/952,674, filed Jul. 30, 2007, entitled "Method and System to Improve Product Recalls", by Mitchell D. Bowlus; and Provisional Application No. 60/954,674, filed Aug. 8, 2007, entitled "Method and System to Improve Product Recalls", by Mitchell D. Bowlus, are each hereby fully incorporated by reference herein in their entirety.

SUMMARY

A method and system is provided to deter purchases of recalled products. An inventory control system is provided with an identification code corresponding to a recalled product. The identification code of the recalled product is identified when it is scanned or otherwise determined to be part of a sale at a retail establishment. The purchase of the recalled product corresponding to the identification code identified is automatically denied.

DETAILED DESCRIPTION

Figure 1:
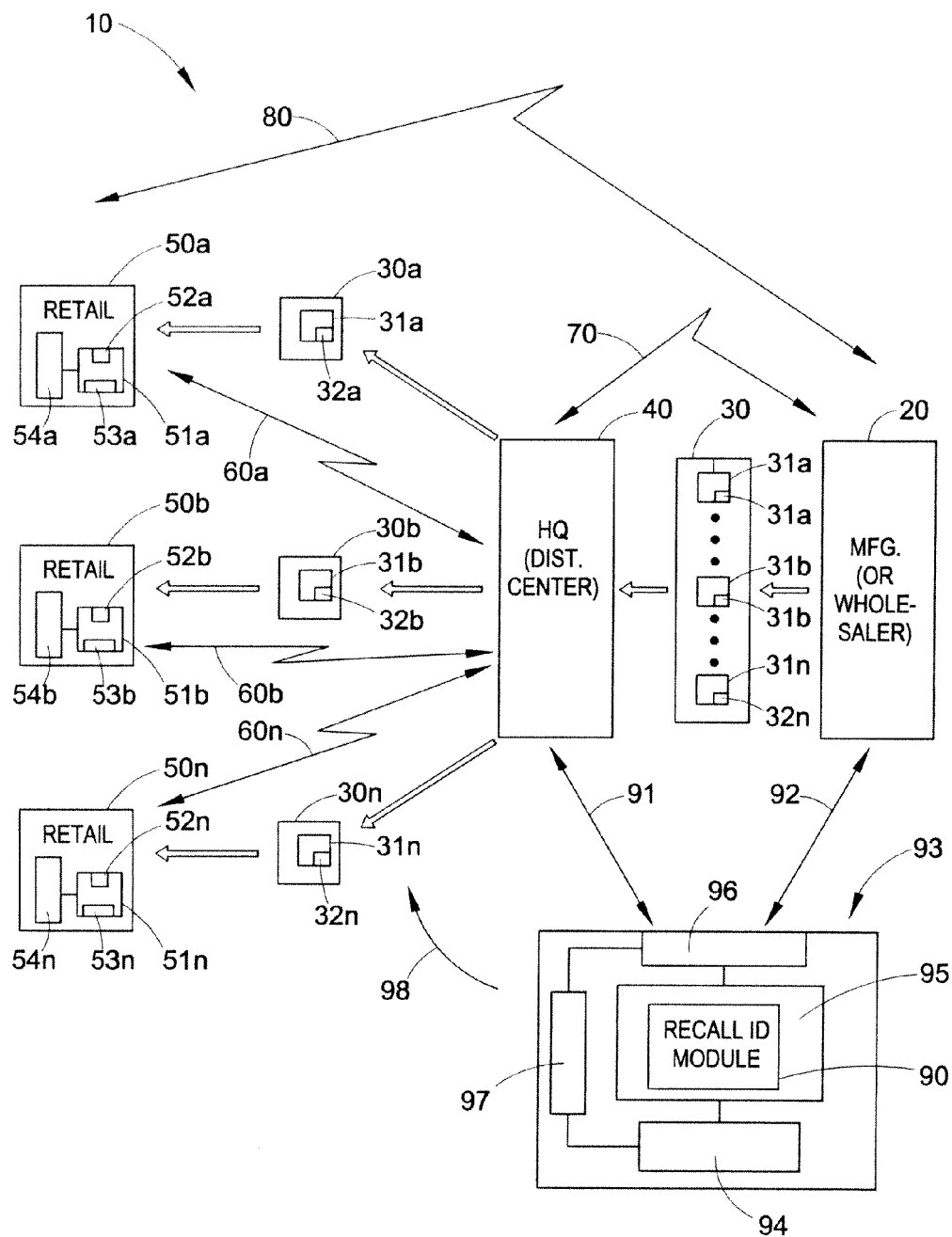
FIG. 1 is an illustration of the present concepts and the environment in which the present concepts may be implemented.

Turning to FIG. 1, illustrated is an environment 10 incorporating concepts of the present application. It is to be appreciated this is a simplified version, and the present concepts may be employed in other environments.

In environment 10, a manufacturer (and/or wholesaler) 20 will produce or distribute a type of product 30. This type of product 30 may consist of a large number of individual products (e.g., 31) as part of the larger product group 30. For example, it may contain thousands if not tens of thousands or more of canned goods, which are then shipped to a retailer (e.g., retailer headquarters) 40. Of course, in actual implementation, it may be sent out to a distribution center controlled by the retailer's headquarters. Each of the individual products 31a-31n of the product type 30 will include some sort of identifier (e.g., 32a-32n). In many situations, it will be a UPC code (RFID tags, etc.) identifying, for example, where the product was manufactured, the date when the product was manufactured, and other information. From the distribution center or retailer headquarters 40, the goods 30 are commonly subdivided into smaller allotments, such as 30a-30n. These smaller allotments are then provided to individual retail stores 50a-50n, as well as being made available over the internet, such as in electronic stores. A consumer who visits the store, either "brick-and-mortar" or electronic, buys individual ones of the products, and then consumes/uses the product.

The individual retail sites 50a-50n are understood to include stores arranged similar to known existing stores. Particularly, in existing retail stores a consumer will purchase a product by finding the product on a shelf within the retail establishment. They bring the product up to a checkout area for purchase. The checkout area commonly consists of a scanner system, which reads identification codes, such as UPC (or other) codes. The person employed by the retail establishment scans the product, which includes having it read by the scanning system, as is commonly known in the industry. This scanning, electronically identifies the product, provides the purchase price, and then also sends information of the purchase to inventory control software associated with the scanner. This information is used so the local retail establishment can maintain a check of products which are still available for sale, and which have been sold.

In some retail establishments, the checkout area is a self-serve area. Nevertheless, the scanner system is still used, and it is the individual shopper who is doing their own scanning. There are also some experimental situations where the scanning is part of a shopping cart carried by the user, or the user is provided with a scanner to scan the products as they move through the store. Also, the retailer may, as mentioned, be an e-commerce establishment. In these situations, there would not be the traditional "check-out" area. However, the use of inventory systems employing UPC (or other) codes and scanners would nevertheless be implemented. Therefore, the concepts of the present application are also applicable in such an environment. In any of these and other arrangements, the general concept of generating inventory information electronically, which may be communicated back to the accounting or other appropriate department of the retail company, the wholesaler or manufacturer, is implemented. Also, it is noted some sellers of goods describe themselves as wholesalers selling directly to the public. It is understood retail as used herein is intended to include such sellers.

As noted above, there are instances when a product is defective. For example, in the area of food, the product may contain bacteria, foreign objects, or other detrimental attribute. In this case, a recall will be issued, by either the retailer, manufacturer (and/or wholesaler) and/or government.

To increase the likelihood that a consumer is not damaged by the defective product, the present application seeks to take advantage of inventory control systems and/or other electronic communication paths employed by companies to communicate between different parts of their company (e.g., between the individual retail establishments that sell the products and the distribution centers, accounting departments, etc.) as well as possibly between the retail company and the manufacturer (or wholesaler), via its communication/computer network 21. For example, the individual retail stores 50a-50n include electronic communication channels 60a-60n, communicating, for example, with the retailer headquarters 40, via its communication/computer network 41. In order to maintain inventory control, a UPC symbol (or other identifier, such as but not limited to an RFID tag), is scanned by check-out scanner systems 51-51n which include output displays 52a-52n, and loudspeakers 53a-53n, among other components. The obtained information is accumulated at the local retail establishment 50a-50n such as by a main server 54a-54n, and then is transmitted via the two-way communication network 60a-60n to the retailer's headquarters 40. This inventory control then communicates how much product is being sold, when new inventory may be needed, among other details.

An inventory (or other) communication network 70 may also exist between the manufacturer (and/or wholesaler) and retail headquarters. Still further, it is possible the local retailer sites 50a-50n may be in electronic communication with the manufacturer (and/or wholesaler), depending upon the relationship between the manufacturer (and/or wholesaler) and the retailer, i.e., communication channel 80). These communication channels or paths 60a-60n, 70, 80 may be via phone lines, cable, internet, satellite or other appropriate arrangements.

In any of these arrangements, the present application describes a method and system to insure that defective products are identified prior to being sold, whether or not errors exist at the retail level, the governmental level, retailer headquarters, etc. Particularly, the present application includes a recall identification module 90, which is shown in operational connection with retailer headquarters 40 via path communication 91. Recall identification module 90 is implemented when a recall notice is issued. The recall identification module 90 takes the identification information, such as the UPC code (RFID tag, etc.) of the defective product, and then communicates via the communication channels, for example, from channel 91, and then through channels 60a-60n, directly to the retail stores. Particularly, the UPC code (RFID tag, etc.) identified with the defective product will have an override entry placed into the inventory system, which does not permit its further sale. Thus, when a customer attempts to purchase the defective product, and the product is scanned via the scanning system or the UPC code is manually entered (as well as any other identification code), the recall identification module will cause the checkout terminal to block the sale of this product. Further, a warning and recall information may also be displayed at the point of sale terminal.

In FIG. 1, recall ID module 90 may be implemented in a separate computer system 93, distinct from the headquarters 40 or manufacturer (or wholesaler) 20. Particularly, it may be part of a computer network/system which includes an input interface 94, which might be any combination of a keyboard, touch-screen display, voice-activated input, input for e-mail, instant mail messaging or other automatic (i.e., non-human controlled) input configurations, as well as any other such system which allows for interaction with the system 93, as well as selectively with the recall ID module 90, which may be stored in a memory area 95 of the computer system 93. Further, the input interface 94 is in operative connection with the storage mechanism 95, such that changes to the recall ID module 90 may be made via input 94. Also included as part of the computer system 93 is an output 96, which allows outputting from the computer system 93, such as downloads from information stored in the recall ID module 90. Particularly, and as will be explained in greater detail, as recall notices are issued via the government or by companies, this information may be input via input/interface 94 to the recall ID module 90. Then, when appropriate, it may be output via output 96. Control of the components of system 93 is achieved in this embodiment by controller 97, which may be a CPU microcontroller or other appropriate device.

Also, while the recall ID module 90 is shown as a separate computer system, it can also be implemented in the computer systems of the manufacturer (i.e., 21), the headquarters (i.e., 41), as well as each of the retail stores (ie., 51a-51n). Also, in one embodiment, the recall ID module 90 may be implemented as part of a website to which the communication/computer systems of the headquarters 40, manufacturer 20, or retail stores 50a-50n can log onto and obtain information from the recall ID module.

Figure 2:
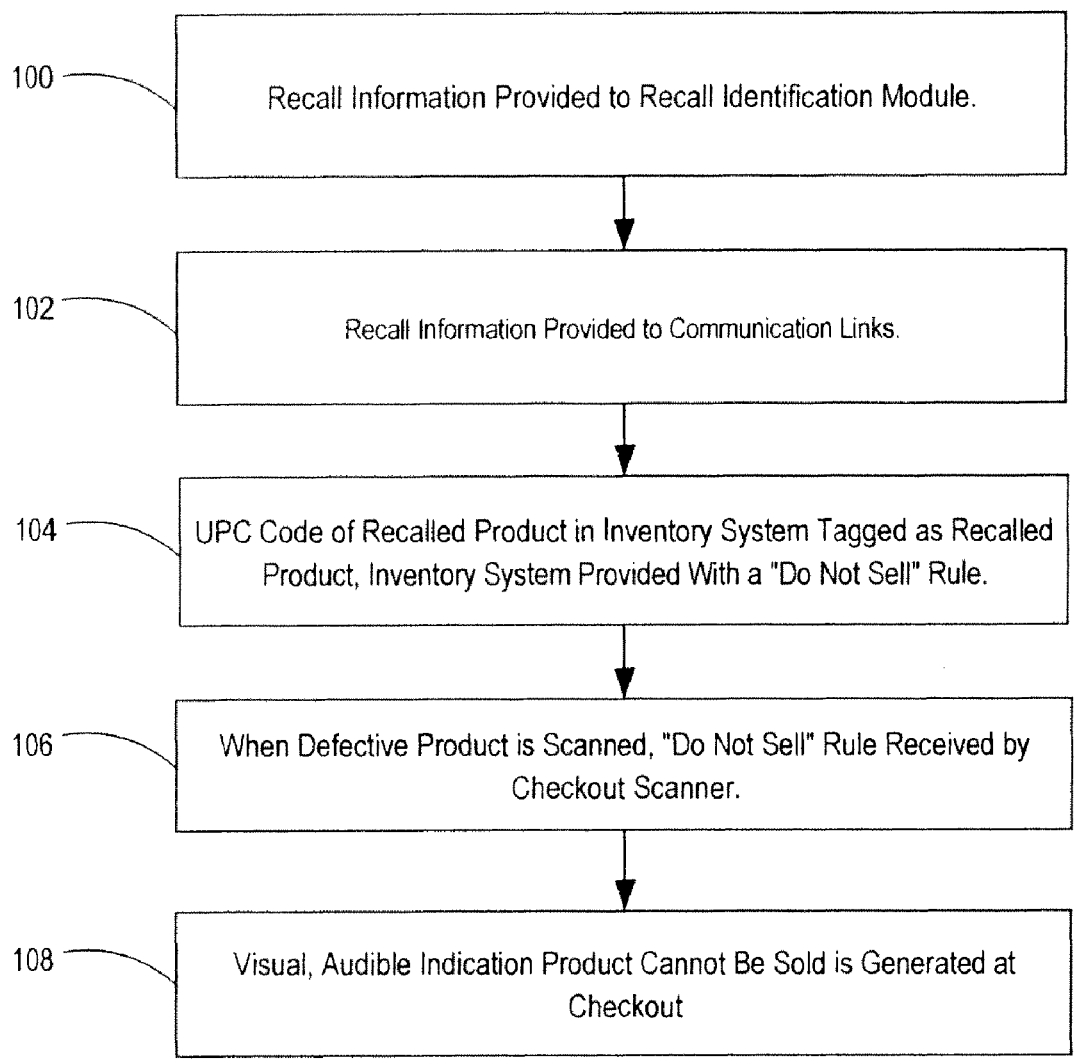
FIG. 2 is a flowchart showing an embodiment of the present concepts.

One embodiment of a recall ID module operational flow is shown in FIG. 2. In step 100, the recall information is entered or provided to the recall module. Such entry may be made via a computer input, as known in the art. This recall information is then provided to the individual retail stores via the inventory or other communication links between the retailer headquarters and individual retail stores 102. The UPC code (RFID tag, etc.) identified in the inventory system as corresponding to the recalled product is provided with a "do not sell" rule 104. When the UPC code (RFID tag, etc.) of the defective product is read by the scanner, the "do not sell" rule is received at the checkout scanner 106. Then, an indication is received at the checkout (either at a manually existing checkout, or at a self-serve checkout), where the product is indicated as not being able to be purchased. A visual, audible or other indication of such refusal, along with notification of the recall notice, may also be displayed at the checkout 108. In the described process flow, the aspects of having the UPC code (RFID tag, etc.) identified in the inventory system as corresponding to the recalled product may be accomplished by a variety of known techniques, including a simple comparison or look-up table operation. Thereafter, once the system identifies the UPC code being scanned as a recalled UPC code, the system to applies the "do not sell" rule.

Figure 3:
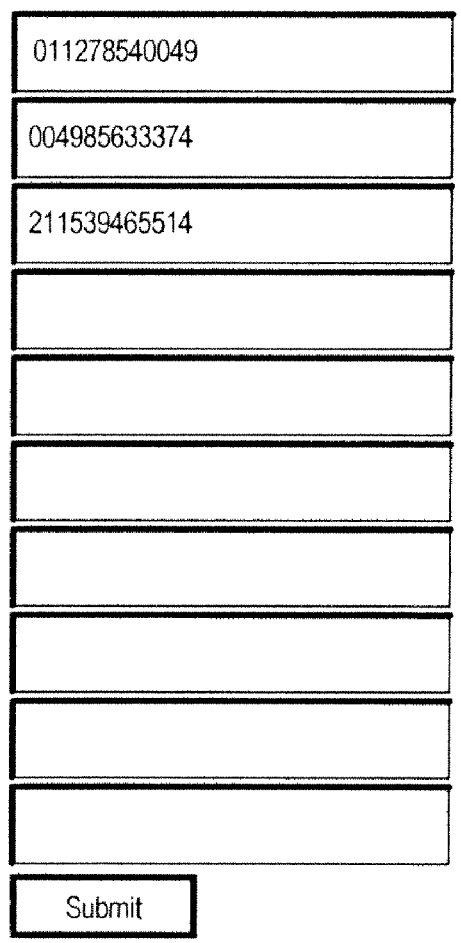
FIG. 3 discloses the inputting of identification codes (e.g., UPC codes, RFID tags, or other identifiers associated with products) into a system of the present application.

Turning to FIG. 3, illustrated is an example of one embodiment of the storage of UPCs 110 corresponding to recalled products. Thus, in one embodiment, the operator operating computer system 93 receives information as to recalled products and their corresponding UPCs. The user enters this information into the recall ID module. This information, depending on the embodiment, is then forwarded to the headquarters 40, manufacturer 20 and/or individual retail outlet 50a-50n, where they may be compared to products being scanned right at the scanner terminals of the retail establishments.

While the above has shown the communication of the recall module of FIG. 1, primarily being provided in operational communication with retail headquarters 40 via path 91, it is also shown by communication line 92 that such communication can be between the manufacturer and/or wholesaler 20 also. This provides yet another communication path by which the recalled identification information might be received by the recall module and/or inputted for further distribution to the local retail establishments 50a-50n. Still further, it is to be understood that another option is to communicate from the computer system 93 directly to the individual retail establishments 50a-50n, such as by communication line 98.

Also, in some embodiments, the recall module 90 is integrated into the inventory software system or other system of the retailer, manufacturer, wholesaler, etc. Thus, while shown in FIG. 1 as a separate system to emphasize its capabilities, this is not required. Rather, the described aspects of recall ID module 90 may be fully implemented within the structure of the headquarters 40, manufacturer 20 or at the individual retailer sites 50-50n. Still further, the recall identification module 90 may be designed in sub-blocks, where certain aspects are located at the retailer 40 and/or manufacturer/wholesaler 20, while other sub-blocks are at the individual retailer sites 50a-50n. Particularly, the system may be designed where only the UPC or other identifying codes are transmitted from the computer system 93 to the various establishments such as headquarters 40, manufacturer/wholesaler 20 and retail establishments 50a-50n, while other portions of the module are resident on systems in these establishments.

For example, the portion of the recall ID module 90 represented by steps 104-108 of FIG. 2 would in many instances be resident on the computer systems of the retail establishments 50a-50n. Thus, in one situation when the recall ID module has been loaded with the UPCs representing recalled products, this information is then pushed out either through the headquarters 40, manufacturer 20 or directly to the retail establishments 50a-50n, then these UPC codes will be stored either on the individual scanners within the retail establishments, or on the main server of the retail establishments. At this point, it is the portions of the recall ID module 90 which are resident at the retail sites which perform the steps 104-108. Particularly, when a product having a UPC code which has been downloaded as a UPC code representing a recalled product is scanned, then code resident in the retail system will tag this (i.e., compare it to the list of recalled products) and thereby identify it as a recalled product. Then the operations to implement the "do not sell" rule are performed at the retail site so that when the defective product is scanned, the "do not sell" rule is implemented so an indication appears at the check-out scanner, either visually and/or audibly, advising the store clerk or buyer that the product cannot be sold.

It is to be understood the tagging operation could be done prior to the scanning, whereby once all identified recalled UPCs are entered into a system, the recall ID module operations would tag each UPC code prior to the scanning operation. Alternatively, the system can be done "on the fly", wherein the comparison is done after a product is scanned. These embodiments are expanded upon in the following FIGS. 4 and 5.

Figure 4:
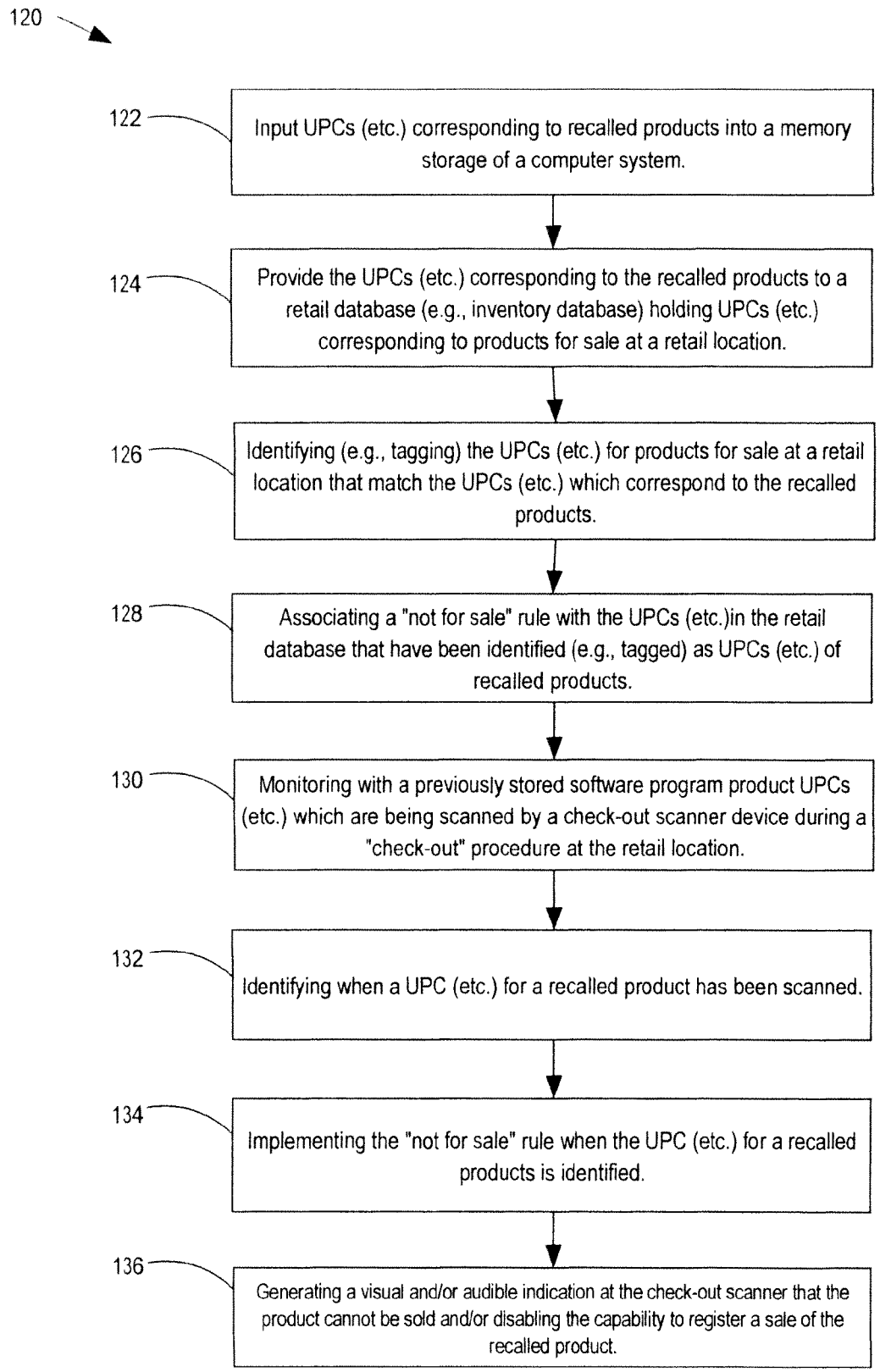
FIG. 4 is a more detailed description of an embodiment according to the present application.

Turning to FIG. 4, illustrated is the process flow 120 for a further embodiment of the present application. In step 122, identification codes (i.e., UPC codes, RFID tags or other appropriate codes which identify products) corresponding to recalled products are input into a memory storage of a computer system according to the present application. In step 124, the UPCs (etc.) corresponding to the recalled products are provided to a retail database (e.g., inventory database) holding UPCs (etc.) corresponding to products for sale at retail locations, such as locations 50a-50n of FIG. 1.

Thereafter, in step 126, the UPCs (etc.) for products for sale at the retail location that match the UPCs which correspond to the recalled products are identified (e.g., tagged). Then as shown in step 128, a "not for sale" rule is associated with the UPCs in the retail database that have been identified (i.e., tagged) as UPCs of the recalled products. Having this information, check-out scanners which have previously-stored software code which is part of or operate in conjunction with the recall ID module 90 of FIG. 1, monitor, as described in step 130, product UPCs which are being scanned during the check-out procedure at the retail locations. When, as in step 132, a UPC for a recalled product has been identified as being scanned or otherwise identified (e.g., there is a comparison operation between the scanned code and known recall UPCS), the "not for sale" rule is implemented, as shown in step 134, whereby the UPC for a recalled product is identified. Thereafter, as described in step 136, a visual and/or audible indication is provided at the check-out scanner indicating that the product cannot be sold. Such indication being noticeable by a human being. For example, the visual indication would be a displayed image on the computer screen of the check-out scanner indicating that no sale is allowed, or in an audible example, a buzzer may ring or a pre-recorded voice may indicate no sale is permitted. Still further, the "not for sale" rule may also disable the capability of the check-out scanner to register a sale of the recalled product.

In this above example, it is noticed that the identification of the recalled UPCs are undertaken prior to any scanning operation being necessary.

Figure 5:
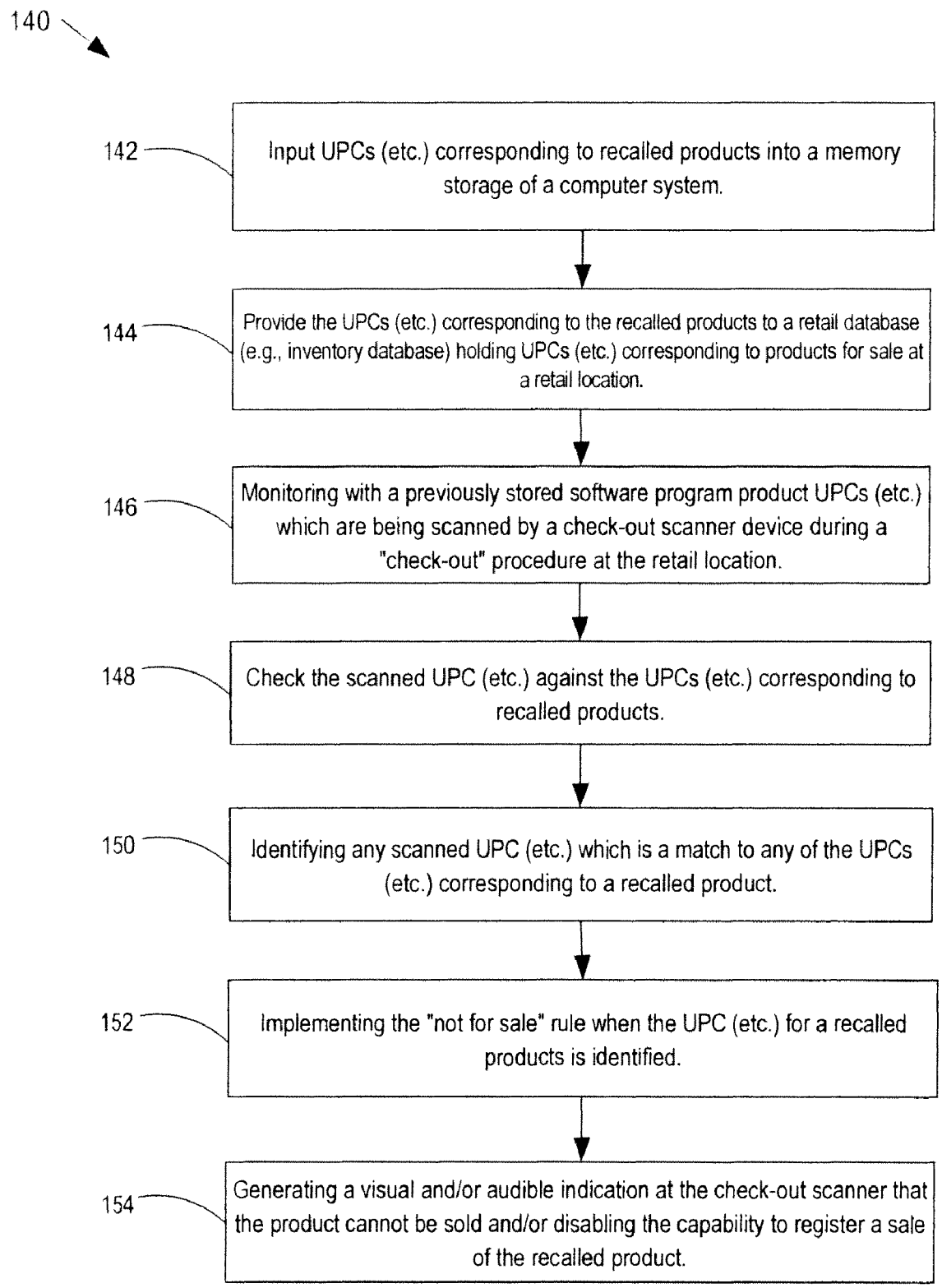
FIG. 5 is a further embodiment of the present concepts.

In an alternative embodiment, as shown in FIG. 5, an "on-the-fly" embodiment is discussed. Particularly, steps 142 and 144 correspond to steps 122 and 124 of FIG. 4. Then in step 146, the process employs the concepts of step 130 of FIG. 4. Particularly, there is a monitoring of product UPCs which are being scanned during the check-out process. However, up to this point, there has been no association of UPCs in the database for the retail products, and the UPCs of the recalled products. In step 148, when a product UPC being sold is scanned, a check is made of the scanned UPC against the UPCs corresponding to the recalled products. Thereafter, in step 150, any scanned UPC (of a product being sold) which is a match to any of the UPCs corresponding to the recalled products are identified. Thus, the process is on-the-fly in the sense that the associations are not predetermined. Thereafter, the steps 152 and 154 correspond to the processes 134 and 136 of FIG. 4. Particularly, the recalled product is identified and an indication warning and/or disablement of the scanning process occurs.

By implementing the above features, it is believed there will be an increase in the inability to identify defective products and therefore will stop a consumer from buying such a defective product.

The exemplary embodiments have been described with reference to the particular embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A method of deterring purchase of recalled products comprising:
    providing an inventory control system having a database of identification codes which correspond to products available for sale in a retail establishment;
    providing to the database of identification codes of the inventory control system an identification code corresponding to a recalled product;
    identifying when the identification code of the recalled product is scanned or otherwise identified in a retail establishment; and
    automatically denying purchase of the recalled product at a check-out scanner,
    wherein the step of providing the identification code corresponding to the recalled product includes matching identification codes of products in the product database to identification codes of recalled products prior to the recalled product being scanned or otherwise identified.

2. The method of claim 1, wherein the identification codes of products in the product database which match the identification codes of recalled products are tagged with a rule to stop the sale of the products by disabling a capability of the check-out scanner to register a sale of the recalled product.

3. The method of claim 1, wherein the identification code is a UPC code.

4. The method according to claim 1, wherein the indicator is an audible indicator provided at a check-out scanner of a retail establishment.

5. The method according to claim 1, wherein the indicator is a visual indicator provided at a check-out scanner of a retail establishment.

6. The method according to claim 1, wherein the identifying and automatically denying steps occur at a scanner check-out system in a retail establishment.

7. A system for deterring purchase of a recalled product comprising:
    a product database which establishes a list of identification codes of products for sale;
    a scanner configured to identify identification codes of products determined to be part of a sale;
    a recall module programmed to:
        receive a list of identification codes corresponding to recalled products;
        determine identification codes of products for sale in the product database that correspond to the identification codes of recalled products prior to the product being identified or determined to be part of a sale;
        provide the identification codes of products for sale which correspond to the identification codes of recalled products with a rule to stop the sale of the products, and
        generate an indicator not to sell a product when one of the identification codes provided with the rule to stop the sale is determined to be part of a sale;
    and
    an output device for outputting the indicator.

8. The system according to claim 7, wherein recall module is located at or integrated into at least one of a retail establishment, a retailing headquarters, and a manufacturer.

9. The system according to claim 8, wherein the recall module is located at or integrated into a manufacturer and communicates the identification codes provided with the rule to stop the sale to at least one of a retail establishment and a retailing headquarters.

10. The system according to claim 8, wherein the recall module is located at or integrated into a retailing headquarters and communicates the identification codes provided with the rule to stop the sale to a retail establishment.

11. The system according to claim 8, wherein the recall module is located at or integrated into a retail establishment.

12. The system according to claim 7, wherein the capability to register a sale is disabled when an identification code provided with the rule to stop the sale is determined to be part of a sale.

13. A method of deterring purchase of a recalled product at a check-out scanner of a retail establishment comprising:
    inputting into a memory storage of a recall ID module of a computer system UPCs which identify products corresponding to recalled products;
    providing to a retail inventory database holding UPCs corresponding to products for sale at a retail location, the UPCs corresponding to the recalled products;
    identifying the UPCs for products for sale at the retail location that match the UPCs which correspond to the recalled products;
    associating a rule with the UPCs in the retail inventory database that have been identified as UPCs of the recalled products;
    providing to check-out scanners which have previously-stored software code which is part of or operate in conjunction with the recall ID module the UPCs of the recalled products;
    monitoring product UPCs which are being scanned during the check-out procedure at the retail location;
    identifying through a comparison operation between the scanned product UPC and the known recalled UPCs, a UPC for a recalled product;
    implementing the rule when the UPC for a recalled product is identified, wherein the rule is a rule to not sell the recalled product; and
    providing an indication at the check-out scanner indicating that the product cannot be sold, such indication being noticeable by a human being.

14. The method of claim 13 wherein the rule disables the capability of the check-out scanner to register a sale of the recalled product.

15. The method according to claim 13 wherein the identification of the recalled UPCs are undertaken prior to any scanning operation being necessary.

16. An on-the-fly method of deterring purchase of a recalled product comprising:

inputting into a memory storage of a recall ID module of a computer system UPCs which identify products corresponding to recalled products;

providing to a retail inventory database holding UPCs corresponding to products for sale at a retail location, the UPCs corresponding to the recalled products;

monitoring product UPCs which are being scanned during a check-out process, wherein at this point, there has been no association of UPCs in the database for the retail products, and the UPCs of the recalled products;

scanning a UPC of a product to be sold;

checking the scanned UPC against the UPCs corresponding to the recalled products;

identifying the scanned UPC of the product being sold to any of the UPCs corresponding to the recalled products, wherein the process is on-the-fly in the sense that the associations are not predetermined;

identifying through a comparison operation between the scanned product UPC and the known recalled UPCs, a UPC for a recalled product;

implementing the rule when the UPC for a recalled product is identified, wherein the rule is a rule to not sell the recalled product; and providing an indication at the check-out scanner indicating that the product cannot be sold, such indication being noticeable by a human being.

17. The method of claim 16 wherein the rule disables the capability of the check-out scanner to register a sale of the recalled product.

* * * * *